(12) United States Patent
Li et al.

(10) Patent No.: US 10,326,512 B2
(45) Date of Patent: Jun. 18, 2019

(54) METHOD AND APPARATUS FOR SHORT-TERM FEEDBACK IN MULTI-INPUT MULTI-OUTPUT COMMUNICATIONS

(71) Applicant: Alcatel Lucent, Nozay (FR)

(72) Inventors: Xun Li, Shanghai (CN); Nan Li, Shanghai (CN); Min Zhang, Swindon (GB); Tao Yang, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/750,981

(22) PCT Filed: Jul. 12, 2016

(86) PCT No.: PCT/IB2016/001152
§ 371 (c)(1),
(2) Date: Feb. 7, 2018

(87) PCT Pub. No.: WO2017/025794
PCT Pub. Date: Feb. 16, 2017

(65) Prior Publication Data
US 2018/0234148 A1  Aug. 16, 2018

(30) Foreign Application Priority Data
Aug. 7, 2015  (CN) .......................... 2015 1 0482106

(51) Int. Cl.
*H04B 7/04* (2017.01)
*H04B 7/06* (2006.01)
(Continued)

(52) U.S. Cl.
CPC ........... *H04B 7/065* (2013.01); *H04B 7/0417* (2013.01); *H04B 7/0456* (2013.01); *H04B 7/0469* (2013.01); *H04B 7/0478* (2013.01)

(58) Field of Classification Search
CPC .... H04B 7/0456; H04B 7/0478; H04B 7/065; H04B 7/0417
(Continued)

(56) References Cited

FOREIGN PATENT DOCUMENTS

| CN | 101814939 A | 8/2010 |
|----|-------------|--------|
| CN | 102868477 A | 1/2013 |

OTHER PUBLICATIONS

Huawei et al., "Codebook Enhancements for EBF/FD-MIMO," 3rd Generation partnership Project (3GPP) TSG RAN WG1 Meeting #81, R1-152484, 6 pages, XP050973036, Fukuoka, Japan, May 25-29, 2015 (Year: 2015).*
(Continued)

*Primary Examiner* — Kevin M Burd
(74) *Attorney, Agent, or Firm* — Fay Sharpe LLP

(57) ABSTRACT

Embodiments of the present disclosure provide a method and apparatus for multi-input multi-output MIMO communications in a wireless communication network. The method comprises: receiving, from a device, long-term precoding information for the MIMO communication, the long-term precoding information indicating a first group of beams for a first antenna polarization, and a second group of beams for a second antenna polarization (S201); receiving, from the device, short-term precoding information for use in the MIMO communication, the short-term precoding information indicating beams selected respectively from the first group of beams and the second group of beams for different antenna polarizations (S202); constructing a precoding matrix for the MIMO communication according to the long-term precoding information and short-term precoding information (S203); and transmitting data encoded according to the precoding matrix to the device (S204). Embodiments of the present disclosure further provide a method in a receiving side of MIMO, and a corresponding apparatus.

13 Claims, 3 Drawing Sheets

(51) Int. Cl.
*H04B 7/0456* (2017.01)
*H04B 7/0417* (2017.01)

(58) Field of Classification Search
USPC .......................................................... 375/267
See application file for complete search history.

(56) References Cited

OTHER PUBLICATIONS

Huawei et al., "Codebook enhancements for EBF/FD-MIMO," $3^{rd}$ Generation Partnership Project (3GPP), 3GPP TSG RAN WG1 Meeting #81, R1-152484, 6 pages, XP050973036, Fukuoka, Japan, May 25-29, 2015.
Alcatel-Lucent Shanghai Bell et al., "3D Codebook Design for 3D MIMO," $3^{rd}$ Generation Partnership Project (3GPP), 3GPP TSG RAN WG1 Meeting #81, R1-152661, 6 pages, XP050973458, Fukuoka, Japan, May 25-29, 2015.
International Search Report for PCT/IB2016/001152 dated Nov. 8, 2016.

* cited by examiner

METHOD AND APPARATUS FOR SHORT-TERM FEEDBACK IN MULTI-INPUT MULTI-OUTPUT COMMUNICATIONS

FIELD

Embodiments of the present disclosure relate to wireless communications, and more specifically to multi-input multi-output (MIMO) communications.

BACKGROUND

Due to limitations of time and frequency resources, improving resource utilization efficiency is a target which is always pursued in communication technology MIMO technology can simultaneously transmit a plurality of data streams on a same time-frequency resource block by exploiting space domain and thereby effectively boost system throughput.

Two-dimensional (2D) MIMO transmission has been studied and adopted in some wireless communication systems, such as the 3rd Generation Partnership Project (3GPP) Long Term Evolution (LTE). As for the 2D-MIMO, traditional antenna arrays are arranged horizontally to form a beam in a horizontal plane. In order to explore potential gain from 3-dimensional (3D) wireless channels, the 3D MIMO has already been discussed in the area of wireless communications, for example, in a 3GPP meeting. For example, 3D MIMO channel modelling has been discussed.

To obtain a 3D MIMO channel, the planar (2D) antenna array is going to be used to obtain the vertical spatial gain. As antenna dimensions and channel dimensions increase, the amount of feedback about channel state information (CSI) also increases. However, resources for measuring the channels and feedback channel capacity for feeding back the CSI are limited, which means that a new feedback structure needs to be proposed, and a new codebook for 3D MIMO needs to be designed, in order to facilitate an effective feedback.

In the latest 3GPP technical report, a 3D MIMO precoder structure has already been determined. The 3D MIMO precoder is divided into a long-term feedback and a short-term feedback. The long-term feedback provides a group of beams, whereas the short-term feedback selects a beam or column from the group of beams of the long-term feedback, and performs a phase adjustment between different antenna polarizations.

Embodiments of the present disclosure provide a solution related to the short-term feedback.

SUMMARY

A brief summary of embodiments is presented below to provide basic understanding of some aspects of various embodiments. The summary is not intended to identify key points of key elements or describe the scope of various embodiments. Its sole purpose is to present some concepts in a simplified form as a prelude to the following more detailed depictions.

According to a first aspect of the present disclosure, there is provided a method for multi-input multi-output MIMO communication in a wireless communication network. The method comprises: receiving, from a device, long-term precoding information for the MIMO communication, the long-term precoding information indicating a first group of beams for a first antenna polarization, and a second group of beams for a second antenna polarization; receiving, from the device, short-term precoding information for the MIMO communication, the short-term precoding information indicating beams selected from the first group of beams and the second group of beams for different antenna polarizations respectively; constructing a precoding matrix for the MIMO communication according to the long-term precoding information and short-term precoding information; and transmitting data encoded according to the precoding matrix to the device.

In an embodiment, the short-term precoding information may further indicate phase adjustment for a horizontal domain and a vertical domain respectively.

In another embodiment, the short-term precoding information may indicate a short-term codebook $W_2$ having one of the following structures:

$$W_2 = \frac{1}{\sqrt{MN}} \begin{bmatrix} e_k \\ (\phi_q \otimes \gamma_{q'}) \cdot e_l \end{bmatrix};$$

$$W_2 = \frac{1}{\sqrt{2MN}} \begin{bmatrix} e_k & e_{k'} \\ (\phi_q \otimes \gamma_{q'}) \cdot e_l & -(\phi_q \otimes \gamma_{q'}) \cdot e_{l'} \end{bmatrix};$$

Wherein M and N represent the number of antennas of a transmitter side in the vertical domain and the horizontal domain respectively; $e_k$ and $e_{k'}$ denote a vector having 1 at the k-th and the k'-th elements and zeros otherwise respectively and are used for selecting beams from the first group of beams for the first antenna polarization; $e_l$ and $e_{l'}$ denote a vector having 1 at the l-th and the l'-th elements and zeros otherwise respectively, and are used for selecting beams from the second group of beams for the second antenna polarization; $\phi_q$ and $\gamma_{q'}$ denote phase adjustment for the vertical domain and the horizontal domain respectively, wherein q and q' denote an index of a candidate phase adjustment factor; $\otimes$ denotes Kronecker product operation; "·" denotes a dot product.

In a further embodiment, the short-term precoding information may indicate a short-term codebook $W_2$ having the following structure:

$$W_2 = \frac{1}{\sqrt{2MN}} \begin{bmatrix} e_k & e_{k'} \\ (\phi_q \otimes \gamma_{q'}) \cdot e_l & -(\phi_q \otimes \gamma_{q'}) \cdot e_{l'} \end{bmatrix};$$

and wherein if k=k' and l=l', a first vector formed by beams selected from the group of beams with $e_k$ and $e_l$ for a first rank is not orthogonal to a second vector formed by beams selected from the group of beams with $e_{k'}$ and $e_{l'}$ for a second rank, and/or if k≠k' or l≠l', the first vector and the second vector are orthogonal.

In an embodiment, an offset between the beams selected respectively from the first group of beams and second group of beams for different antenna polarizations may be limited to a range specified by a maximum offset value, wherein the maximum offset value may be predetermined or notified through signaling. In another embodiment, the maximum offset value is different for the MIMO communication with different ranks.

In another embodiment, in the short-term codebook $W_2$ l∈{k−$t_1$, . . . , k−1, k, k+1, . . . , k+$t_1$} and/or l'∈{k'−$t_2$, . . . , k'−1, k', k'+1, . . . , k'+$t_2$}, wherein the values of $t_1$ and $t_2$ are predetermined or notified through signaling. In a further embodiment, it may be set that $t_1$≠$t_2$.

In an embodiment, phase adjustment factors $\phi_q$ and $\gamma_{q'}$ for the vertical domain and the horizontal domain in the short-term codebook W2 may be selected from different sets of candidate values of phase adjustment factor respectively. In another embodiment, $\phi_q$ and $\gamma_{q'}$ are selected from a same set of candidate values of phase adjustment factor. In a further embodiment, values of $\phi_q$ and $\gamma_{q'}$ are related to corresponding antenna port indices.

In another embodiment, in the short-term codebook $W_2$, one of $\phi_q$ and $\gamma_{q'}$ may be a fixed value, and the other of $\phi_q$ and $\gamma_{q'}$ may be a configurable value. In a further embodiment, the fixed value indicates that for the second polarization, the phase adjustment factor on each antenna port is identical; and the configurable value indicates the phase adjustment factor on each antenna port for the second polarization respectively. In another embodiment, $\phi_q$ and $\gamma_{q'}$ are both configurable values, and indicate the phase adjustment factor on each antenna port for the horizontal domain and the vertical domain for the second polarization respectively.

According to a second aspect of the present disclosure, there is provided a method for multi-input multi-output MIMO communication in a wireless communication network. The method comprises: transmitting, to a device, long-term precoding information for MIMO communication, the long-term precoding information indicating a first group of beams for a first antenna polarization, and a second group of beams for a second antenna polarization; transmitting, to the device, short-term precoding information for the MIMO communication, the short-term precoding information indicating beams selected from the first group of beams and the second group of beams for different antenna polarizations respectively; wherein the long-term precoding information and the short-term precoding information are used for the device to construct a precoding matrix for the MIMO communication; and receiving, from the device, data encoded according to the precoding matrix.

According to a third aspect of the present disclosure, there is provided an apparatus for multi-input multi-output MIMO communication in a wireless communication network, the apparatus comprises: a first receiving unit configured to receive, from a device, long-term precoding information for the MIMO communication, the long-term precoding information indicating a first group of beams for a first antenna polarization, and a second group of beams for a second antenna polarization; a second receiving unit configured to receive, from the device, short-term precoding information for the MIMO communication, the short-term precoding information indicating beams selected from the first group of beams and the second group of beams for different antenna polarizations respectively; a precoding matrix constructing unit configured to construct a precoding matrix for the MIMO communication according to the long-term precoding information and short-term precoding information; and a transmitting unit configured to transmit data encoded according to the precoding matrix to the device.

According to a fourth aspect of the present disclosure, there is provided an apparatus for multi-input multi-output MIMO communication in a wireless communication network. The apparatus comprises: a first transmitting unit configured to transmit, to a device, long-term precoding information for MIMO communication, the long-term precoding information indicating a first group of beams for a first antenna polarization, and a second group of beams for a second antenna polarization; a second transmitting unit configured to transmit, to the device, short-term precoding information for the MIMO communication, the short-term precoding information indicating beams selected from the first group of beams and the second group of beams for different antenna polarizations respectively; wherein the long-term precoding information and the short-term precoding information are used by the device to construct a precoding matrix for the MIMO communications; and a receiving unit configured to receive, from the device, data encoded according to the precoding matrix.

The method or apparatus according to embodiments of the present disclosure can improve efficiency of short-term precoding information feedback and improve the performance of 3D MIMO.

Although specific embodiments are illustrated in the drawings illustrate by way of example, it should be appreciated that descriptions of specific embodiments herein are not intended to limit the embodiments to the specific forms disclosed.

BRIEF DESCRIPTION OF DRAWINGS

Objects, advantages and other features of the present disclosure will become more apparent from the disclosure and claims below. Just for illustration purpose, non-limiting descriptions of example embodiments are presented with reference to Figures, in which:

DETAILED DESCRIPTION OF EMBODIMENTS

A lot of details are presented in the following description for illustration purpose. However, those skilled in the art will appreciate that embodiments of the present disclosure may be implemented without using these specific details. Hence, the present disclosure is not intended to be limited by the illustrated embodiments, but be endowed the broadest scope consistent with principles and features described herein.

It should be appreciated that the terms "first", "second" and the like are only used to distinguish one element from another. In practice, the first element can also be called the second element, or vice versa. In addition, it should be appreciated that "comprising" and "including" are only used to illustrate existence of the stated features, elements, functions and components, and do not exclude existence of one or more other features, elements, functions or components.

For ease of illustration, embodiments of the present disclosure will be introduced in the context of 3GPP LTE/LTE-Advanced (LET-A), and using specific terms in LTE/LTE-A. However, as appreciated by those skilled in the art, embodiments of the present disclosure are by no means limited to application environment of 3GPP LTE/LTE-A, but on the contrary, may be applied to any wireless communication system where similar problems exist, for example, WLAN or other communication system to be developed in the future. Likewise, the apparatus in the present disclosure may be user equipment (UE) or any terminal having a wireless communication function, including but not limited to a mobile phone, computer, personal digital assistant, a gaming machine, wearable devices, sensor and the like. The term UE may be used interchangeable with mobile station, subscriber station, mobile terminal, user terminal or wireless device. In addition, the apparatus may also be a network node, such as a Node B (Node B or NB), Base Transceiver Station (BTS), base station (BS), or base station sub-system (BSS), relay, remote radio head (RRH) and the like.

Figure 1:
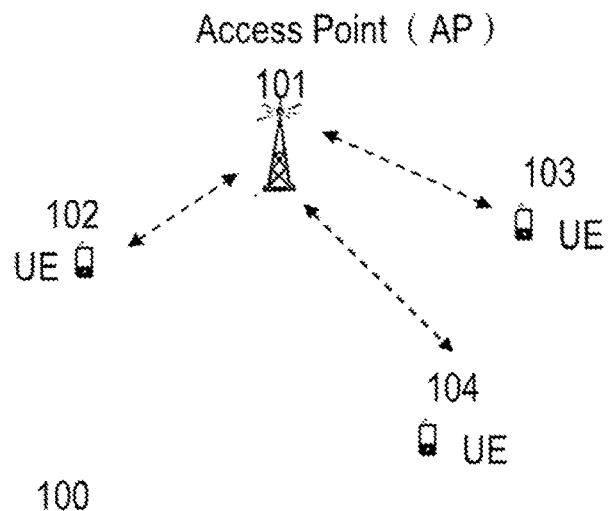
FIG. 1 illustrates a schematic diagram of an example wireless communication system in which a method according to an embodiment of the present disclosure can be implemented.

FIG. 1 illustrates a schematic diagram of an wireless communication system in which a method according to an embodiment of the present disclosure can be implemented. The wireless communication system 100 may include one or more network nodes 101 which for example may be in the form of a base station in this example, e.g., evolved node B (eNodeB or eNB). It will be appreciated that the network node 101 could also be in other forms, e.g., a Node B (Node B or NB), Base Transceiver Station (BTS), base station (BS), or base station sub-system (BSS), relay or the like. The network node 101 may provide radio connection for a plurality of wireless devices (e.g., UE 102-104) located within its coverage.

The network node 101 may be equipped with a 2D antenna array (e.g., an antenna array with M rows and N columns and with cross polarization) to provide 3D MIMO communication with the UE. The MIMO communication may be applied to a downlink direction from the base station to the UE, or to an uplink direction from the UE to the base station. Regarding the downlink MIMO, the UE may estimate channel state information (CSI) based on, for example, a downlink pilot signal and feedback it to the base station, for the base station side to obtain proper transmission parameters for downlink MIMO communication.

Precoding Matrix Index (PMI) is a kind of important channel state feedback information in an MIMO communication system, and it specifies an index of a precoding matrix for MIMO. At 3GPP meetings, it has already been agreed that a codebook $W_{3D}$ of 3D MIMO adopts the following basic structure:

$$W_{3D} = W_1 W_2 \quad (1),$$

wherein the $W_1$ is a long-term and wide-band precoding matrix (or called codebook) feedback which indicates a group of beams according to the long-term CSI, $W_2$ is a short-term sub-band precoding matrix feedback which further selects a specific beam from the group of beams defined by $W_1$ i.e. select a specific column from the group of beams of the long-term codebook, and adjusts phase between different antenna polarizations. $W_1$ codebook and $W_2$ codebook are selected from respective codebook set respectively and fed back to a transmitter side of MIMO.

At present, during 3 GPP standardization, some special requirements are set for the design of the MIMO codebook, and these requirements include, for example, amplitude constant property and nesty property; wherein amplitude constant property requires the amplitude of the codebook to be constant, i.e., the precoding does not increase the transmission power; whereas the nesty property requires the codebook designed for a low-rank to be a subset for a codebook designed for a high-rank. However, most of the solutions related to 3D MIMO codebook currently disclosed do not comply with the above requirements set by 3GPP, and requires large implementation complexity and/or great work effort in terms of standardization. In addition, existing codebooks in 3GPP specifications, e.g., codebooks recited in TS36.211, are based on Grid of Beams (GoB) principle, and the design of these codebooks only takes horizontal dimension, not vertical dimension into account, so they are not appropriate for 3D MIMO channels. In addition, a design principle for short-term codebook $W_2$ has not yet been disclosed currently.

In the present disclosure, assume that the long-term codebook $W_1$ has already been selected, a method and apparatus for designing and feeding back the short-term codebook are proposed on this basis to improve the performance of a 3D MIMO system.

As an example, a 2D antenna array of a transmitter (e.g., eNB) may have M rows and N columns of active antennas, and a signal received at a receiver (e.g., UE) may be expressed as follows:

$$Y = H_{3D} W_{3D} s + n \quad (2),$$

wherein Y represents a received signal prior to combination, s represents a transmitted signal, n represents noise and interference, $H_{3D}$ represents a 3D channel, and $W_{3D}$ represents a 3D precoder, and $W_{3D}$ may be represented by the above formula (1). As described above, $W_1$ in formula (1) is a long-term and wide-band codebook feedback which indicates a group of beams according to the long-term CSI, whereas $W_2$ is a short-term sub-band codebook feedback which further selects a specific beam from a group of beams defined by $W_1$ according to the short-term CSI, i.e., selects a specific column from the group of beams of the long-term codebook, and adjusts the phase between different antenna polarizations. As an example, the structure of $W_1$ may be expressed as follows, but the present disclosure is not limited to the structure:

$$W_1 = \begin{bmatrix} X_V^i \otimes X_H^j & \\ & X_V^{i'} \otimes X_H^{j'} \end{bmatrix} \quad (3)$$

Wherein $X_V^i$ and $X_H^j$ may be beams selected from for example discrete Fourier transform (DFT) matrix. In the present disclosure, assume $W_1$ is already selected, and is formed a group of beams for each polarization of 2D cross polarization (X-pol) active antenna array. In this example, a group of beams formed for the first polarization is $X_V^i \otimes X_H^j$, whereas a group of beams formed for the second polarization is $X_V^{i'} \otimes X_H^{j'}$. Furthermore, wherein $\otimes$ represents the Kronecker product operation which combines precoders in a horizontal domain and a vertical domain.

Figure 2:
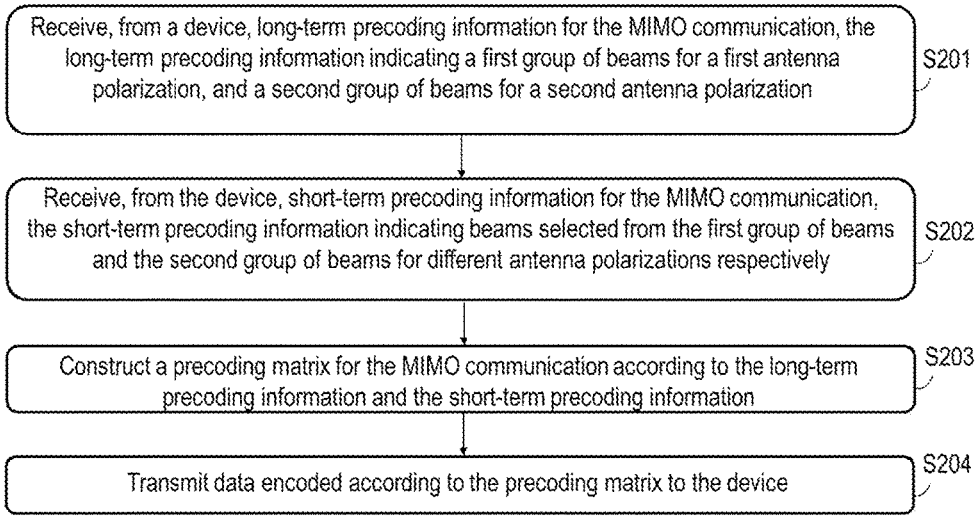
FIG. 2 illustrates a flow chart of a method implemented at a transmitter of MIMO according to an embodiment of the present disclosure.

Now referring to FIG. 2 which illustrates a flow chart of a method 200 for MIMO communication in a wireless communication network (e.g., a network 100) according to an embodiment of the present disclosure. The method 200 may be performed by a transmitter of MIMO, e.g., performed by eNB 101 in FIG. 1 in the case of downlink MIMO, or performed by any one of UE 102-104 in FIG. 1 in the case of uplink MIMO. Only as an example, the method is performed by eNB in the following descriptions.

As shown in FIG. 2, the method 200 comprises: at block S201, the eNB receives from a device (e.g., UE 102) long-term precoding information for MIMO communication, the long-term precoding information indicats a first group of beams for a first antenna polarization, and a second group of beams for a second antenna polarization; at block S202, the eNB receives, from the device, short-term precoding information for use in the MIMO communication, the short-term precoding information indicating beams selected respectively from the first group of beams and the second group of beams for different antenna polarizations; selecting beams for different antenna polarizations respectively rather than selecting a same beam for different polarizations enables flexible provision of short-term precoding information, thereby improving the performance of 3D MIMO; then, at block S203, the eNB constructs the precoding matrix for the MIMO communication according to the long-term precoding information and short-term precoding information; and at block S204, the eNB transmits data encoded according to the precoding matrix to the device.

In an embodiment, the long-term precoding information received at block S201 may indicate a long-term codebook $W_1$ with the structure as shown in equation (3), wherein the first group of beams is specified by $X_V^i \otimes X_H^j$, and the second group of beams is specified by $X_V^{i'} \otimes X_H^{j'}$. However, it should be appreciated that embodiments of the present disclosure are not limited to such example long-term precoding information, and in practice, the long-term precoding information may indicate, in any proper form, the first group of beams for the first antenna polarization and the second group of beams for the second antenna polarization.

In another embodiment, the short-term precoding information received at block 202 may further indicate phase adjustment for the horizontal domain and the vertical domain respectively. Indicating phase adjustment for the horizontal domain and the vertical domain respectively makes the short-term precoding information more flexible and more applicable for short-term channel environment, and thereby facilitates improving the performance of 3D MIMO.

In a further embodiment, the short-term precoding information received at block 202 may indicate a short-term codebook $W_2$ with one of the following structures:

$$W_2 = \frac{1}{\sqrt{MN}} \begin{bmatrix} e_k \\ (\phi_q \otimes \gamma_{q'}) \cdot e_l \end{bmatrix}; \quad (4)$$

$$W_2 = \frac{1}{\sqrt{2MN}} \begin{bmatrix} e_k & e_{k'} \\ (\phi_q \otimes \gamma_{q'}) \cdot e_l & -(\phi_q \otimes \gamma_{q'}) \cdot e_{l'} \end{bmatrix}; \quad (5)$$

Wherein the structure shown in formula (4) is for MIMO with rank 1, whereas the structure shown in formula (5) is for MIMO with rank 2. In formulas (4-5), M and N represent the number of antennas at the transmitter side in the vertical domain and the horizontal domain respectively; $e_k$ and $e_{k'}$ respectively denote a vector having 1 at the k-th and the k'-th elements and zeros otherwise, and are used to select beams from the first group of beams for the first antenna polarization; $e_l$ and $e_{l'}$ respectively denote a vector having 1 at the l-th and the -th elements and zeros otherwise and are used to select beams from the second group of beams for the second antenna polarization; $\phi_q$ and $\gamma_{q'}$ respectively denote phase adjustment for the vertical domain and the horizontal domain, wherein q and q' denote an index of a candidate phase adjustment factor; $\otimes$ denotes Kronecker product operation; "•" denotes a dot product.

As can be seen from formula (4-5), such a structure of $W_2$ allows for selection of columns for the first polarization and second polarization respectively through $e_k$ and $e_l$. A size of $e_k$ is equal to the number of beams or columns in the group of beams (e.g., $X_V^i \otimes X_H^j$) in $W_1$. If $e_k$ is multiplied with $X_V^i \otimes X_H^j$, this indicates that the $K^{th}$ column of $X_V^i \otimes X_H^j$ in $W_1$ is selected for the short-term feedback. Similarly, a size of $e_l$ is likewise equal to the number of beams or columns in the group of beams $X_V^{i'} \otimes X_H^{j'}$ in $W_1$. If $e_l$ is multiplied with $X_V^{i'} \otimes X_H^{j'}$, this indicates that the $l^{th}$ column of $X_V^{i'} \otimes X_H^{j'}$ is selected for the short-term feedback. Therefore, beam selection is performed respectively for different polarizations, which ensures flexibility of selection.

In an embodiment, the short-term precoding information indicates a short-term codebook $W_2$ having the structure as shown in formula (5) and having a rank 2. Furthermore, if k=k' and l=l', a first vector formed by beams selected from the group of beams through $e_k$ and $e_l$ for the first rank may not be orthogonal to a second vector formed by beams selected from the group of beams through $e_{k'}$ and $e_{l'}$ for the second rank, because according to the $W_2$ structure of formula (5), by using the phase adjustment vector only, orthogonality between ranks can already be guaranteed. If k≠k' or l≠l', orthogonality between the first vector and the second vector must be guaranteed.

In addition, in an embodiment, regarding short-term codebook $W_2$ with rank 2, columns are selected respectively for different ranks. That is to say, $(e_{k'}, e_{l'})$ and $(e_k, e_l)$ are selected independently, wherein $e_{k'}$ and $e_{l'}$ are used to select the beam/column for the second rank from the group of beams $X_V^{i'} \otimes X_H^{j'}$. Likewise, in selection of the beam/column for the second rank, a beam is selected respectively for different antenna polarizations, namely, $e_{k'}$ and $e_{l'}$ are selected separately. Similarly, the size of $e_{k'}$ and $e_{l'}$ are equal to the number of beams or columns in the groups of beams $X_V^i \otimes X_H^j$ and $X_V^{i'} \otimes X_H^{j'}$ in $W_1$.

It should be appreciated that the structure of $W_2$ presented above is only for illustration and nor for limitation. In practice, embodiments of the present disclosure may also include other $W_2$ structures to implement column selection for different antenna polarizations.

Although the short-term precoding information received at block 202 performs column selection for different antennal polarizations respectively, in an embodiment, an offset between the beams selected from the first group of beams and second group of beams for different antenna polarizations respectively may be limited to a range specified by a maximum offset value. The maximum offset value may be predetermined or notified through signaling. In a practical 3D MIMO channel, columns selected for two polarizations of cross polarized antennas are usually not much different, or in other words, the column selected for the second antenna polarization only exhibits a small change relative to the column selected for the first antenna polarization.

Based on the above consideration, in an embodiment, regarding the short-term codebook $W_2$ in formula (4-5), it may be set that l is only allowed to be selected in a certain range of offset for k so as to reduce the size of the short-term codebook. For example, $l \in \{k-t_1, \ldots, k-1, k, k+1, \ldots, k+t_1\}$ and/or $l' \in \{k'-t_2, \ldots, k'-1, k', k'+1, \ldots, k'+t_2\}$ may be set, wherein $t_1$ and $t_2$ are a maximum offset between k and l and between k' and l' respectively, and they define a range from which l and l' are selected. A value represented by the maximum offset may be predetermined or notified through signaling, for example notified to the UE by the base station.

In an embodiment, the maximum offset value may be different for MIMO communication with different ranks. For example, regarding formula (4), the maximum offset between k and l is $t_1$, whereas for formula (5), the maximum offset between k' and l' is $t_2$, and $t_1$ and $t_2$ may be different. In another embodiment, the same maximum offset may be adopted for situations with different ranks.

In addition, in examples shown in (4)-(5), $\phi_q$ and $\gamma_{q'}$ are allowed to take different values, wherein q and q' represent an index for a candidate phase adjustment factor for the vertical domain or horizontal domain respectively. For example, $\phi_q$ and $\gamma_{q'}$ may be represented as $\phi_q \in \{\phi_1, \phi_2, \ldots \phi_Q\}$, $\gamma_{q'} \in \{\gamma_1, \gamma_2, \ldots \gamma_{Q'}\}$. This enables phase adjustment to be performed for the vertical domain and the horizontal domain respectively, and this enables more precise and flexible short-term precoding information to be fed back.

In an embodiment, $\phi_q$ and $\gamma_{q'}$ may be selected from the same set of candidate values of phase adjustment factor. In another embodiment, $\phi_q$ and $\gamma_{q'}$ may be selected respectively from different sets of candidate values of phase adjustment factor.

In a further embodiment, values of $\phi_q$ and $\gamma_{q'}$ may not be selected, but related to corresponding antenna port indices. In an embodiment, $\phi_q$ and $\gamma_{q'}$ may be implicitly determined by corresponding antenna port indices. For example, $\phi_q$ and $\gamma_{q'}$ may be fixed values related to antenna port indices, to thereby produce phase rotation between antenna ports and create a specific codebook set.

In an embodiment, in the short-term codebook $W_2$, one of $\phi_q$ and $\gamma_{q'}$ may be a fixed value, and the other of $\phi_q$ and $\gamma_{q'}$ may be a configurable value. For example, it may be assumed that in the horizontal domain, for the second polarization, the phase adjustment factor on each antenna port is identical, namely $\gamma_{q'} = [1, 1, \ldots, 1]^{Tr}$. Therefore, design is only made for the phase adjustment factor in the vertical domain, namely, $\phi_q \in \{\phi_1, \phi_2, \ldots, \phi_Q\}$, $\phi_q = e^{j\theta_q}$. In another embodiment, it may be assumed that in the horizontal domain, for the second polarization, the phase adjustment factor on each antenna port is different, but is a fixed value. In this case, design may also be made only for the phase adjustment factor in the vertical domain. In another embodiment, it may be assumed that in the vertical domain, for the second polarization, the phase adjustment factor on each antenna port is fixed (e.g., identical, namely, $\phi_q = [1, 1, \ldots, 1]^{Tr}$), whereas design is only made for the phase adjustment factor in the horizontal domain, e.g., $\gamma_{q'} \in \{\gamma_1, \gamma_2, \ldots, \gamma_{Q'}\}$, $\gamma_{q'} = e^{j\theta'_{q'}}$.

As may be appreciated, in another embodiment, in the short-term codebook $W_2$, $\phi_q$ and $\gamma_{q'}$ may both be configurable values and indicate the phase adjustment factor on each antenna port for the second polarization in the horizontal domain and vertical domain respectively. For example, it is permissible that the phase adjustment factor of each antenna port is different for the second polarization in the horizontal domain. That is to say, $\phi_q \in \{\phi_1, \phi_2, \ldots \phi_Q\}$, $\gamma_{q'} \in [\gamma_{q'1}, \gamma_{q'2}, \ldots \gamma_{q',N/2}]^{Tr}$, $\phi_q = e^{j\theta_q}$ and $\gamma_{q',n} = e^{j\theta'_{q',n}}$, wherein $\gamma_{q',n}$ represents the phase adjustment factor on the n$^{th}$ antenna port for the second polarization of the cross polarized antenna array in the horizontal domain. Alternatively, it is permissible that the phase adjustment factor of each antenna port is different for the second polarization in the vertical domain. That is to say, $\gamma_{q'} \in \{\gamma_1, \gamma_2, \ldots, \gamma_{Q'}\}$, $\phi_q \in [\phi_1, \phi_2, \ldots, \phi_M]^{Tr}$, $\gamma_{q'} = e^{j\theta'_{q'}}$, and $\phi_{q,m} = e^{j\theta_{q,m}}$, wherein $\phi_{q,m}$ represents the phase adjustment factor on the m$^{th}$ antenna port for the second polarization of the cross polarized antenna array in the vertical domain.

The short-term codebook for 3D MIMO can be effectively designed according to embodiments of the present disclosure so that the short-term precoding information is provided flexibly, and/or the size of the short-term codebook and feedback overhead is reduced by introducing relevance of codebook selection for different antenna polarizations. According to embodiments of the present disclosure, multiple-rank transmission in the vertical domain can be refrained from causing interference between ranks, thereby realizing improvement of the performance of 3D-MIMO system and meanwhile reducing complexity for eliminating interference on the UE side.

Figure 3:
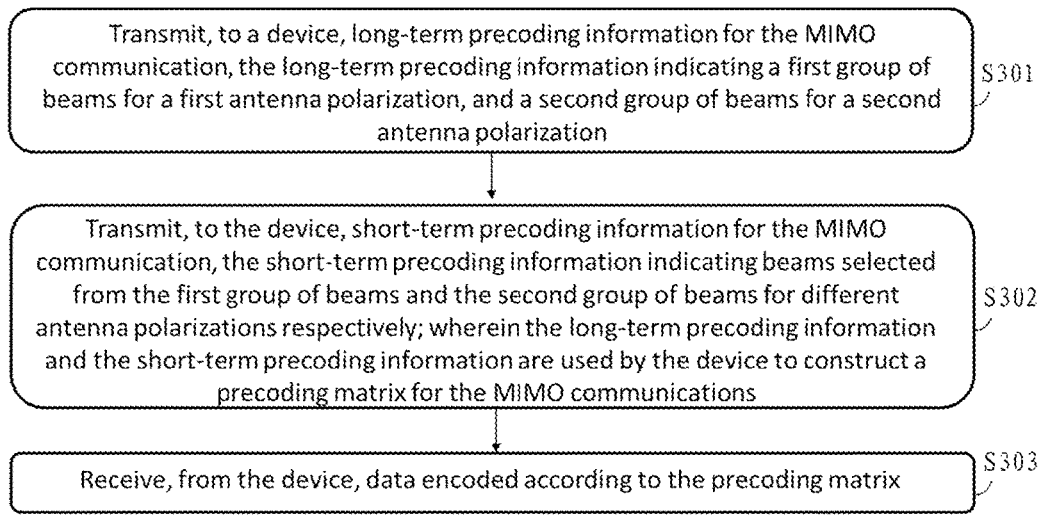
FIG. 3 illustrates a flow chart of a method implemented at a receiver of MIMO according to an embodiment of the present disclosure.

Reference is made below to FIG. 3 which illustrates a flow chart of a method 300 for multi-input multi-output MIMO communications in a wireless communication network according to an embodiment of the present disclosure. The method 300 may be performed by a receiver of MIMO, for example, performed by any of UE 102-104 in FIG. 1 in the case of downlink MIMO, or performed by eNB 101 in FIG. 1 in the case of the uplink MIMO. Only as an example, the method is executed by the UE in the depictions below.

As shown in FIG. 3, the method 300 comprises: at block S301, transmitting, to eNB device, the long-term precoding information for MIMO communication, the long-term precoding information indicating a first group of beams for the first antenna polarization, and a second group of beams for the second antenna polarization; at block S302, transmitting to the eNB the short-term precoding information for the MIMO communication, the short-term precoding information indicating a beam selected from the first group of beams and the second group of beams for different antenna polarizations respectively; wherein the long-term precoding information and the short-term precoding information are used by the eNB to construct a precoding matrix for the MIMO communication; and at block S303, receiving, from the eNB, data encoded according to the precoding matrix.

The UE performing the example method 300 may communicate with the eNB which performs the example method 200, including performing transmission and reception of data, and transmission and reception of feedback information related to MIMO. Hence, the long-term precoding information transmitted at the block S301 may be the long-term precoding information received at the block S201 in the method 200 described with reference to FIG. 2. Hence, the descriptions regarding the long-term precoding information with reference to FIG. 2 and method 200 also apply here and therefore are not repeated any longer.

Likewise, the short-term precoding information transmitted at the block S302 may be the short-term precoding information received at the block S202 in the method 200 described with reference to FIG. 2. Hence, the descriptions regarding the short-term precoding information and short-term codebook $W_2$ with reference to FIG. 2 and method 200 also apply here and therefore are not repeated any longer. For example, the short-term precoding information transmitted at block S302 may indicate the short-term codebook $W_2$ with one of structures (4-5).

Figure 4:
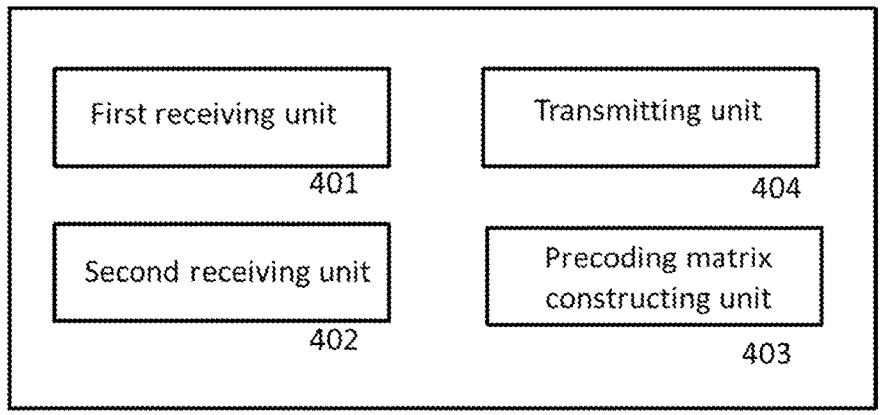
FIG. 4 illustrates a block diagram of an apparatus implemented at a transmitter of MIMO according to an embodiment of the present disclosure.

FIG. 4 illustrates an example block diagram of an apparatus 400 for multi-input multi-output MIMO communications in a wireless communication network according to an embodiment of the present disclosure. In an embodiment, the apparatus 400 may be implemented as a transmitter in MIMO communication (e.g., eNB 101 or UE 102) or a part thereof. The apparatus 400 is operable to execute the method 200 depicted with reference to FIG. 2, and any other processing and methods. It should be appreciated that the method 200 is not limited to being performed by the apparatus 400, and at least some blocks of the method 200 may also be executed by other means or entities.

As shown in FIG. 4, the apparatus 400 comprises a first receiving unit 401 configured to receive from a device the long-term precoding information for MIMO communication, the long-term precoding information indicating a first group of beams for the first antenna polarization, and a second group of beams for the second antenna polarization; a second receiving unit 402 configured to receive, from the device, short-term precoding information for the MIMO communication, the short-term precoding information indicating beams selected from the first group of beams and the second group of beams for different antenna polarizations respectively; a precoding matrix constructing unit 403 configured to construct the precoding matrix for the MIMO communication according to the long-term precoding information and short-term precoding information; and a transmitting unit 404 configured to transmit data encoded according to the precoding matrix to the device.

Since the apparatus 400 is operable to perform the method 200 as depicted with reference to FIG. 2, the depictions regarding the long-term precoding information, short-term precoding information and the short-term codebook $W_2$ with reference to FIG. 2 and method 200 also apply here and therefore are not repeated any longer.

Figure 5:
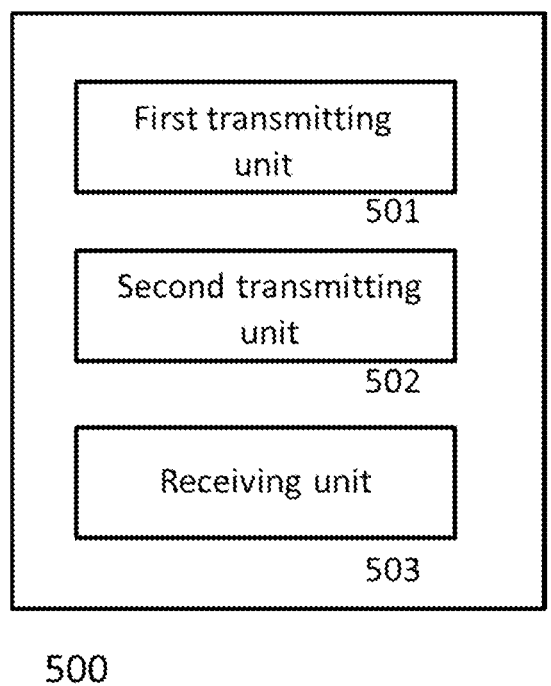
FIG. 5 illustrates a block diagram of an apparatus implemented at a receiver of MIMO according to an embodiment of the present disclosure.

FIG. 5 illustrates an example block diagram of an apparatus 500 for multi-input multi-output MIMO communications in a wireless communication network according to an embodiment of the present disclosure. In an embodiment, the apparatus 500 may be implemented as a receiver in MIMO communication (e.g., eNB 101 or UE 102) or a part thereof, and may perform MIMO communication with the apparatus 400. The apparatus 500 is operable to execute the method 300 depicted with reference to FIG. 3, and any other processing and methods. It should be appreciated that the method 300 is not limited to being performed by the apparatus 500, and at least some blocks of the method 300 may also be executed by other means or entities.

As shown in FIG. 5, the apparatus 500 comprises a first transmitting unit 501 configured to transmit, to a device (e.g., eNB), long-term precoding information for MIMO communication, the long-term precoding information indicating a first group of beams for the first antenna polarization, and a second group of beams for the second antenna polarization; a second transmitting unit 502 configured to transmit, to the device, the short-term precoding information for the MIMO communication, the short-term precoding information indicating beams selected respectively from the first group of beams and the second group of beams for different antenna polarizations; wherein the long-term precoding information and the short-term precoding information are used by the device to construct a precoding matrix for the MIMO communications; and a receiving unit 503 configured to receive, from the device, data encoded according to the precoding matrix.

Since the apparatus 500 is operable to perform the method 300 as depicted with reference to FIG. 3 and communicate with the apparatus 400, the depictions regarding the long-term precoding information, short-term precoding information and the short-term codebook with reference to method 200 and method 300 also apply here and therefore are not repeated any longer.

Advantages of the method and apparatus proposed by the present disclosure comprise at least one of the following:
  can effectively design a short-term codework for use in 3D MIMO;
  enable the short-term precoding information to be provided flexibly;
  reduce the size of the short-term codebook and feedback overhead by introducing relevance of codebook selection for different antenna polarizations;
  multiple-rank transmission in the vertical domain can be refrained from causing interference between ranks, thereby realizing improvement of the performance of 3D-MIMO system and meanwhile reducing complexity for eliminating interference on the UE side.

Those skilled in the art can easily appreciate that blocks or steps in the above methods may be performed by a programmed computer. In the present disclosure, some embodiments are intended to cover a program storage device such as a digital data storage medium, which stores an instruction program which is machine or computer-readable and may be executed by an coded machine or may be executed by a computer, wherein the instruction performs some or all steps of the above methods. The program storage device may be for example a digital memory, a magnetic storage medium such as a magnetic disk or magnetic tape, a hard disk driver or optically-readable digital data storage medium. The embodiments are further intended to cover a computer programmed to execute steps of the above method.

Functions of elements of the apparatus shown in the FIGS. may be provided by using software, dedicated hardware, and hardware associated with proper software and being capable of executing software, or firmware, or a combination thereof. When provided by a processor, the functions may be provided by a single dedicated processor, a single shared processor or a plurality of separate processors. In addition, the term "processor" may include but is not limited to a digital signal processor (DSP) hardware, a network processor, an application-specific integrated circuit (ASIC), a field programmable gate array (FPGA), a Read Only Memory (ROM) for storing software, Radom Access Memory (RAM), and a non-volatile memory. It may further comprise other conventional and/or customized hardware.

Those skilled in the art should appreciate that the description and FIGS. only illustrate the principles of the present disclosure. Hence, it should be appreciated that those skilled in the art can design various arrangements, though not explicitly described or shown herein, reflecting principles of the present disclosure and are included in the spirit and scope of the present disclosure. In addition, all examples as illustrated here are mainly intended for teaching purpose expressly to help a reader to understand principles of the present disclosure and the concept contributed by the inventor to further the field, and should be construed as not limited to these specific examples and conditions illustrated. Furthermore, all illustrations and their specific examples of the principle, aspect and embodiments of the present disclosure are also intended to cover their equivalents.

What is claimed is:

1. A method for multi-input multi-output MIMO communication in a wireless communication network, comprising:
  receiving, from a device, long-term precoding information for the MIMO communication, the long-term precoding information indicating a first group of beams for a first antenna polarization, and a second group of beams for a second antenna polarization;
  receiving, from the device, short-term precoding information for the MIMO communication, the short-term precoding information indicating beams selected from the first group of beams and the second group of beams for different antenna polarizations respectively;
  constructing a precoding matrix for the MIMO communication according to the long-term precoding information and the short-term precoding information, wherein the short-term precoding information indicates a short-term codebook $W_2$ with one of the following structures:

$$W_2 = \frac{1}{\sqrt{MN}} \begin{bmatrix} e_k \\ (\phi_q \otimes \gamma_{q'}) \cdot e_l \end{bmatrix};$$

-continued $$W_2 = \frac{1}{\sqrt{2MN}} \begin{bmatrix} e_k & e_{k'} \\ (\phi_q \otimes \gamma_{q'}) \cdot e_l & -(\phi_q \otimes \gamma_{q'}) \cdot e_{l'} \end{bmatrix};$$

wherein M and N represent the number of antennas of at a transmitter side in the vertical domain and the horizontal domain respectively; $e_k$ and $e_{k'}$ denote a vector with 1 at the k-th and the k'-th elements and zeros otherwise respectively for selecting a beam from the first group of beams for the first antenna polarization; $e_l$ and $e_{l'}$ denote a vector with the 1 at the l-th and the l'-th elements and zeros otherwise respectively for selecting a beam from the second group of beams for the second antenna polarization; $\phi_q$ and $\gamma_{q'}$ denote phase adjustment for the vertical domain and the horizontal domain respectively, wherein q and q' denote an index of a candidate phase adjustment factor; $\otimes$ denotes Kronecker product operation; "•" denotes a dot product; and transmitting data encoded according to the precoding matrix to the device.

2. The method according to claim 1, wherein the short-term precoding information further indicates phase adjustments for a horizontal domain and a vertical domain respectively.

3. The method according to claim 1, wherein an offset between the beams selected from the first group of beams and the second group of beams for different antenna polarizations respectively is within a range specified by a maximum offset value, wherein the maximum offset value is predetermined or notified through signaling.

4. The method according to claim 3, wherein the maximum offset value is different for the MIMO communication with different ranks.

5. The method according to claim 1, wherein in the short-term codebook $W_2$, $l \in \{k-t_1, \ldots, k-1, k, k+1, \ldots, k+t_1\}$ and/or $l' \in \{k'-t_2, \ldots, k'-1, k', k'+1, \ldots, k'+t_2\}$, wherein values of $t_1$ and $t_2$ are predetermined or notified through signaling.

6. The method according to claim 1, wherein $\phi_q$ and $\gamma_{q'}$ satisfy one of the following:

$\phi_q$ and $\gamma_{q'}$ are selected from different sets of candidate values of phase adjustment factor respectively;

$\phi_q$ and $\gamma_{q'}$ are selected from a same set of candidate values of phase adjustment factor;

values of $\phi_q$ and $\gamma_{q'}$ are related to corresponding antenna port indices;

one of $\phi_q$ and $\gamma_{q'}$ is a fixed value, and the other of $\phi_q$ and $\gamma_{q'}$ is a configurable value; and $\phi_q$ and $\gamma_{q'}$ are both configurable values and indicate the phase adjustment factors on each antenna port for the second polarization for the horizontal domain and the vertical domain.

7. A method for multi-input multi-output MIMO communication in a wireless communication network, comprising:

transmitting, to a device, long-term precoding information for the MIMO communication, the long-term precoding information indicating a first group of beams for a first antenna polarization, and a second group of beams for a second antenna polarization;

transmitting, to the device, short-term precoding information for the MIMO communication, the short-term precoding information indicating beams selected from the first group of beams and the second group of beams for different antenna polarizations respectively, the long-term precoding information and the short-term precoding information being used by the device to construct a precoding matrix for the MIMO communications, wherein the short-term precoding information indicates a short-term codebook $W_2$ with one of the following structures:

$$W_2 = \frac{1}{\sqrt{MN}} \begin{bmatrix} e_k \\ (\phi_q \otimes \gamma_{q'}) \cdot e_l \end{bmatrix};$$

$$W_2 = \frac{1}{\sqrt{2MN}} \begin{bmatrix} e_k & e_{k'} \\ (\phi_q \otimes \gamma_{q'}) \cdot e_l & -(\phi_q \otimes \gamma_{q'}) \cdot e_{l'} \end{bmatrix};$$

wherein M and N represent the number of antennas at a transmitter side in the vertical domain and the horizontal domain respectively; $e_k$ and $e_{k'}$ denote a vector with 1 at the k-th and the k'-th elements and zeros otherwise respectively for selecting beams from the first group of beams for the first antenna polarization; $e_l$ and $e_{l'}$ denote a vector with the 1 at l-th and the l'-th elements and zeros otherwise respectively for selecting beams from the second group of beams for the second antenna polarization; $\phi_q$ and $\gamma_{q'}$ denote phase adjustment for the vertical domain and the horizontal domain respectively, wherein q and q' denote an index of a candidate phase adjustment factor; $\otimes$ denotes Kronecker product operation; "•" denotes a dot product; and receiving, from the device, data encoded according to the precoding matrix.

8. The method according to claim 7, wherein the short-term precoding information further indicates phase adjustments for a horizontal domain and a vertical domain.

9. The method according to claim 7, wherein an offset between the beams selected respectively from the first group of beams and second group of beams for different antenna polarizations is within a range specified by a maximum offset value, wherein the maximum offset value is predetermined or notified through signaling.

10. The method according to claim 7, wherein in the short-term codebook $W_2$, $l \in \{k-t_1, \ldots, k-1, k, k+1, \ldots, k+t_1\}$ and/or $l' \in \{k'-t_2, \ldots, k'-1, k, k'+1, \ldots, k'+t_2\}$, wherein values of $t_1$ and $t_2$ are predetermined or notified through signaling.

11. The method according to claim 7, wherein $\phi_q$ and $\gamma_{q'}$ satisfy one of the following:

$\phi_q$ and $\gamma_{q'}$ are selected from different sets of candidate values of phase adjustment factor respectively;

$\phi_q$ and $\gamma_{q'}$ are selected from a same set of candidate values of phase adjustment factor;

values of $\phi_q$ and $\gamma_{q'}$ are related to corresponding antenna port indices one of $\phi_q$ and $\gamma_{q'}$ is a fixed value, and the other of $\phi_q$ and $\gamma_{q'}$ is a configurable value; and $\phi_q$ and $\gamma_{q'}$ are both configurable values and indicate the phase adjustment factors on each antenna port for the second polarization for the horizontal domain and the vertical domain.

12. An apparatus comprising a processor and a non-transitory machine readable storage medium, the non-transitory machine readable storage medium containing instructions that, when executed on the processor, cause the apparatus to:

receive, from a device, long-term precoding information for the MIMO communication, the long-term precoding information indicating a first group of beams for a first antenna polarization, and a second group of beams for a second antenna polarization;

receive, from the device, short-term precoding information for the MIMO communication, the short-term precoding information indicating beams selected respectively from the first group of beams and the second group of beams for different antenna polarizations, wherein the short-term precoding information indicates a short-term codebook $W_2$ with one of the following structures:

$$W_2 = \frac{1}{\sqrt{MN}} \begin{bmatrix} e_k \\ (\phi_q \otimes \gamma_{q'}) \cdot e_l \end{bmatrix};$$

$$W_2 = \frac{1}{\sqrt{2MN}} \begin{bmatrix} e_k & e_{k'} \\ (\phi_q \otimes \gamma_{q'}) \cdot e_l & -(\phi_q \otimes \gamma_{q'}) \cdot e_{l'} \end{bmatrix},$$

wherein M and N represent the number of antennas at a transmitter side in the vertical domain and the horizontal domain respectively; $e_k$ and $e_{k'}$ denote a vector with 1 at the k-th and the k'-th elements and zeros otherwise respectively for selecting a beam from the first group of beams for the first antenna polarization; $e_l$ and $e_{l'}$ denote a vector with 1 at the l-th and the l'-th elements and zeros otherwise respectively for selecting a beam from the second group of beams for the second antenna polarization; $\phi_q$ and $\gamma_{q'}$ denote phase adjustment for the vertical domain and the horizontal domain respectively, wherein q and q' denote an index of a candidate phase adjustment factor; ⊗ denotes Kronecker product operation; "•" denotes a dot product;

construct a precoding matrix for the MIMO communication according to the long-term precoding information and the short-term precoding information; and transmit, to the device, data encoded according to the precoding matrix.

13. An apparatus comprising a processor and a non-transitory machine readable storage medium, the non-transitory machine readable storage medium containing instructions that, when executed on the processor, cause the apparatus to:

transmit, to a device, long-term precoding information for MIMO communication, the long-term precoding information indicating a first group of beams for a first antenna polarization, and a second group of beams for a second antenna polarization;

transmit, to the device, short-term precoding information for use in the MIMO communication, the short-term precoding information indicating a beam selected from the first group of beams and the second group of beams for different antenna polarizations respectively, the long-term precoding information and the short-term precoding information being used by the device to construct a precoding matrix for the MIMO communications wherein the short-term precoding information indicates a short-term codebook $W_2$ with one of the following structures:

$$W_2 = \frac{1}{\sqrt{MN}} \begin{bmatrix} e_k \\ (\phi_q \otimes \gamma_{q'}) \cdot e_l \end{bmatrix};$$

$$W_2 = \frac{1}{\sqrt{2MN}} \begin{bmatrix} e_k & e_{k'} \\ (\phi_q \otimes \gamma_{q'}) \cdot e_l & -(\phi_q \otimes \gamma_{q'}) \cdot e_{l'} \end{bmatrix},$$

wherein M and N represent the number of antennas at a transmitter side in the vertical domain and the horizontal domain respectively; $e_k$ and $e_{k'}$ denote a vector with 1 at the k-th and the k'-th elements and zeros otherwise respectively for selecting a beam from the first group of beams for the first antenna polarization; $e_l$ and $e_{l'}$ denote a vector with 1 at the l-th and the l'-th elements and zeros otherwise respectively for selecting a beam from the second group of beams for the second antenna polarization; $\phi_q$ and $\gamma_{q'}$ denote phase adjustment for the vertical domain and the horizontal domain respectively, wherein q and q' denote an index of a candidate phase adjustment factor; ⊗ denotes Kronecker product operation; "•" denotes a dot product; and receive, from the device, data encoded according to the precoding matrix.

* * * * *